Sept. 24, 1946.  A. M. WOLFE  2,408,357
NAVIGATION COMPUTER
Filed July 6, 1944
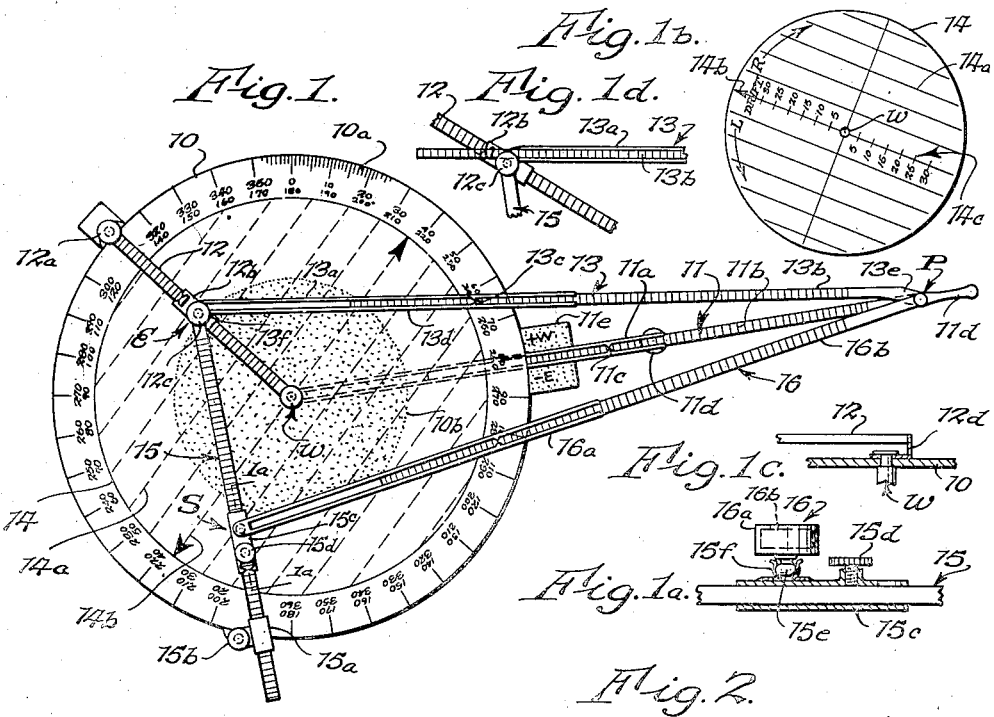
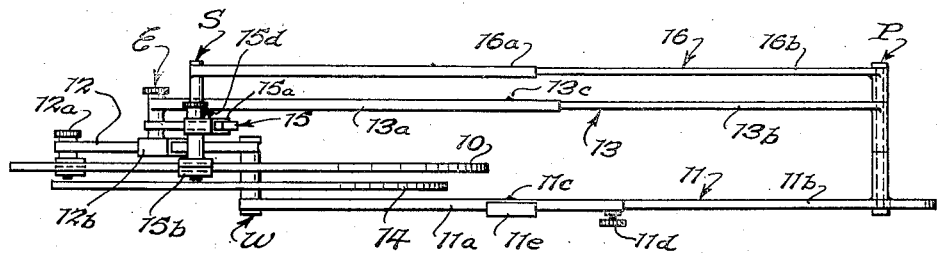
INVENTOR.
Asher M. Wolfe
BY
C. A. Norton
ATTY.

Patented Sept. 24, 1946

2,408,357

UNITED STATES PATENT OFFICE 2,408,357

NAVIGATION COMPUTER

Asher M. Wolfe, Bloomsburg, Pa.

Application July 6, 1944, Serial No. 543,677

16 Claims. (Cl. 33—76)

This invention relates to an improved air navigation computer, and more particularly to a computer constructed and adapted to be used in the navigation of aircraft operating from an aircraft carrier. While my invention is of particular advantage for such purposes, it will be understood, however, that its use is not limited thereto, and it may be advantageously employed in solving navigation problems generally.

When operating an airplane from an aircraft carrier, the pilot must be always on the alert for indications of the enemy, in the air, on the surface, and under the water. He must also constantly watch for any unusual objects on the surface, such as life rafts, boats, and the like.

In addition he must constantly check the instruments indicating the performance of his own craft. All this must be done while carrying out his orders, which may require flying over considerable distances while out of sight of the carrier. It is, therefore, vital for him to be at all times absolutely certain of his own position and that of the carrier, and to be able quickly to work out navigation problems, should emergencies develop requiring a change in his original flight plan.

His many duties other than navigation do not permit him to engage in complicated and time-consuming plotting methods for solving navigational problems, with the ever-present possibility of error due to inadvertence or excitement. The navigation which he is required to do while flying must be done quickly and accurately, and without interference with his other duties.

With the use of the computer according to my invention, the pilot is able to solve all necessary navigational problems easily and quickly, with a minimum possibility of error, and without the necessity of laying the problem out in vector form on paper.

Among the objects of my invention may be mentioned the following:

To provide a navigation computer particularly adapted for use by pilots of aircraft operating from aircraft carriers, and which will quickly solve vector problems without requiring the drawing of vector diagrams.

To provide such a computer which will enable the pilot quickly to visualize the problem, thus reducing the possibility of error.

To provide such a computer which is simple, positive, and reliable in operation, light in weight, small in size, and inexpensive to manufacture.

To provide a simple and accurate method of solving navigation problems involving relative movement.

To provide a navigation computer that will solve any complicated dead reckoning problems as well as the simple.

To provide a computer that can be used direct on maps if desired.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a plan view of a computer in accordance with my invention, Fig. 1a is a detail section taken on line 1a—1a, Fig. 1, partly in section, on an enlarged scale, of one of the joints of my computer, Fig. 1b is a detail view of one of the disks which may be used, Fig. 1c is a detail view of one form of pivot I may use, Fig. 1d is a detail view of a form of connection between two arms of my computer, Fig. 2 is a side elevation of the computer of Fig. 1, partly in section, and Figs. 3a, 3b, 3c, and 3d show typical adjustments of my computer in solving navigation problems.

In accordance with my invention, my computer may comprise a disk 10 preferably, but not necessarily, of transparent material, calibrated in degrees from true north from 0° clockwise to 360°, and also, if desired, in reciprocals in smaller figures (in degrees from true south from 0° to 360° clockwise). Pivotally attached at the center W of the disk there may be provided an extensile or telescoping arm 11 calibrated in air speed in knots or miles per hour.

Any suitable telescoping arrangement may be used, such, for example, as is employed in slide rules; but for economy of space, weight, and materials, I prefer to provide a channeled member 11a of thin sheet, preferably non-magnetic, metal, or plastic, within which there may be mounted the calibrated slider 11b.

An indicator may be provided, such as an index pointer 11c on the member 11a, so that as the arm 11 is lengthened and shortened, the true air speed may be read directly from the indicator. A screw clamp 11d or any other suitable arrangement may be provided for securing the arm 11 at the length to which it is adjusted. The arm 11 is preferably, but not necessarily, mounted under the disk 10.

A second arm 12 may also be pivoted at the point W for rotation about said point as a center. This is preferably arranged so that it may be rotated through 360° and a clamp such as screw 12a may be provided for securing it to the rim of disk 10 in the particular angular position to which it may be set. This arm 12 is preferably calibrated in knots or miles per hour wind velocity.

It is preferable for arm 12 to extend past point W and to have the pivot on an offset bracket 12d as shown in Fig. 1c for a reason which will be described later.

A third arm 13 may be pivotally secured at point P to the outer extremity of arm 11, and to a point on a sliding sleeve 12b, slidable on the arm 12. The offsetting of the pivot on bracket 12d permits sleeve 12b to slide past point W in case point E should fall directly over point W. A clamp such as screw 12c may be provided for locking the arms against movement of point E after adjustment. The arm 13, like arm 12, is extensile and is preferably made in two parts, 13a and 13b, telescoping one into the other, and may be calibrated in knots or miles per hour, and may have an index pointer 13c.

The ends of arm 13 may be slightly offset as indicated at 13e and 13f so that the edge 13d may permit a pencil mark made against this edge to lie accurately in the line connecting points E and P. This is desirable for solving wind star problems. The other arms 11 and 16 may have similarly offset ends if desired, and the arm 11 may project slightly beyond point P to form a handle 11d for convenience of operation.

Also, secured to the disk 10 at point W, and preferably, although not necessarily, between it and the arm 11, and mounted for rotation, I may provide a second disk 14 preferably, but not necessarily, of transparent material, which may be marked with a number of parallel lines, as at 14a, and with an indicating arrow, as at 14b. This disk may also have a drift scale 14c and the letters L and R with appropriate arrows, as shown in Fig. 1b. The two disks 10 and 14 and the three arms 11, 12, and 13, are all that is necessary for solving simple problems.

For example, the length of the arm 11 may indicate the true air speed and the angular position of the arm the true heading in degrees from true north, the length of arm 13 the ground speed, the angular position of arm 13 the true course, the length from W to E on arm 12 the wind velocity, and the angular position of arm 12 the wind direction.

If the pilot knows his true heading and his true air speed, and the wind direction and velocity, he can quickly determine his true course and ground speed, as follows: He will first set the arm 12 to the angular position of the wind direction on scale 10a, and lock it in position by clamp 12a. The point E will then be moved along the arm 12 and set for the wind velocity. He will then adjust the length of arm 11 to read true air speed, and tighten the clamp 11d to hold the arm 11 in adjusted length. Then he will swing point P until the angular position of arm 11 corresponds to his true heading as shown by scale 10a.

The length of the arm 13 will then represent the ground speed of the airplane and may be read directly from pointer 13c off the scale on the arm 13. The direction of point P from point E will represent the true course. To read the direction of point P from point E in degrees, the navigator rotates disk 14 until the lines 14a marked on it run parallel with the arm EP (13). Then the arrowhead 14b will point to the true course in degrees from true north.

It will be seen that if the true heading and air speed remain the same and the wind changes velocity, as the point E is moved along arm 12 to the new wind velocity, the arm 13 will increase or decrease in length and the direction of point P from point E will change. Similarly, should the wind change its direction, as arm 12 is rotated to the new direction, arm 13 will change correspondingly.

With the construction so far described, it is possible to find the true course, knowing the true heading as already described, or to find the true heading and air speed to be maintained for a given true course and ground speed. In the latter case, one would set the wind direction and velocity first, then adjust arm 13 to the direction of true course by setting disk 14 to indicate true course, swing point P until arm 13 is parallel with the lines 14a, and then adjust the length of arm 13 for ground speed of the airplane. The length of the arm 11 will then represent the air speed of the airplane, which may be read from the scale on arm 11, and the angle of the arm 11 will represent the true heading which must be maintained to make good the true course, and this may be read directly from the scale 10a.

If it is desired to solve problems involving a surface ship, such as a carrier, as in a geographic sector search to a moving base, relative sector search, relative square search, fictitious ship, etc., additional structure will be provided. This may comprise the arm 15 pivoted at point E to the sleeve 12b or arm 12 and carrying a sleeve 15a having clamp 15b, by which it may be secured to the periphery of disk 10. This arm will be calibrated for the speed of the surface ship.

Arm 16, similar to arms 11 and 13, may also be provided, pivoted at points S and P, and this arm may comprise a pair of extensile, telescoping members 16a and 16b and may be calibrated in miles per hour or knots. The point S is made adjustable along arm 15 by means of sleeve 15c and a clamp 15d may be provided for holding the adjustment. Preferably, the connection between arms 15 and 16 at point S is made "quick detachable" as by ball 15e on arm 16, engaging spring socket 15f on sleeve 15c. This is necessary for certain adjustments, as for instance when the airplane's course is the same as the surface ship's, when arm 13 would otherwise strike or jam at point S. It is desirable that the arms 13 and 16 be so arranged that parts 13b and 16b be able to slide in parts 13a and 16a beyond the pivot points E and S respectively as indicated in Fig. 1d.

To set the surface ship's course, the disk 14 will be rotated until the arrow 14b points to the ship's course, clamp 15b will be loosened, and the arm 15 rotated about point E until it is parallel to the lines 14a. It is then clamped in position.

The point S will then be adjusted along arm 15 until it is at the position of the surface ship's speed, and then clamped in position. Then the angular position of arm 16 will represent the direction of relative movement, and the length of arm 16 the speed of relative movement. The former may be read from scale 10a by rotating disk 14 until the lines on it are parallel to arm 16, and the latter read from the scale on arm 16.

Under some conditions it may be desirable to disconnect sleeve 15a from the rim of disk 10, and to clamp it at the end of arm 12. This may be easily and quickly done by providing an extension on the clamp 12a of approximately the same thickness as disk 10. Other ways in which this may be done will be readily apparent. This is necessary if the surface ship's course is the reciprocal of the wind's direction, in order to let arm 15 fall directly over arm 12.

It will be observed that the arms 11, 13, and 16 are all pivoted at the common point P. Any shift in point P circumferentially will change the direction of all three arms, and the length of the arms 13 and 16 when arm 11 is locked at 11d. If arm 11 is unlocked at 11d, any movement of point P in a radial direction will change the length of arms 11, 13, and 16, and the direction of arms 13 and 16. Some typical adjusted positions of my computer, as used in solving navigational problems, are shown in Figs. 3a to 3d inclusive, and it will be noted that in every case shown in these figures there are two triangles having one side common. These triangles may lie one within the other, may partly overlap, or may be without overlap.

Wind stars may also be worked with my computer. To facilitate this, I prefer to frost the center of the disk 10 in the circle 10b so that a pencil mark may be made upon it. I may also attach a small tab 11e of frosted plastic or other material to arm 11 so that the compass variation may be written on it, for convenience in correction of true heading to magnetic heading or vice versa.

The following is an example of how a wind star problem is worked with my computer:

While flying on a true heading of 061° at a true air speed of 125 k. the pilot notes a drift of 14° R. To set this up he swings arm 11 (or W—P) until it reads 061° on scale 10a of disk 10 and adjusts the length of arm 11 to true air speed of 125 k. He then revolves disk 14 until 14b reads 061° or the parallel lines (14a) run parallel with arm 11. Then since the drift is 14° R, he moves disk 14 to the right for 14° or the pointer 14b to 075° (061°+14°=075°). Then he adjusts point E of arm 13 (E—P) until it is parallel to the lines on disk 14 and draws a line along edge 13d of arm 13 on the frosted area of disk 10. He repeats the above operation for the following two headings:

True heading 121°, true air speed 125 k., drift 7° R.
True heading 001°, true air speed 125 k., drift 6½° R.

From the above operation he will have three lines drawn on the frosted area of disk 10. These three lines will all cross and establish a point. From this point to W will be the direction the wind is blowing and the distance from this point to W will be the velocity. The wind in this case is from 340° with a velocity of 30 k.

In a relative square search a relative wind must be determined. For this purpose the radius of disk 14 extending to point 14b will preferably be calibrated in terms of relative wind velocity. In working problems involving relative wind, the disk 14 may be revolved until the radius to point 14b lines up with points W and S.

In the above disclosure I have explained the problems with the wind plotted up-wind; that is, from E to W. The problems, however, may be plotted down-wind; that is, with the wind blowing from W to E, and if that is done, then the arm 13 will represent the true heading and air speed instead of true course and ground speed, and the arm 11 will then represent the true course and ground speed.

A solution of a typical problem involving an airplane and a surface ship will now be given, explaining the use of my computer.

Suppose a relative sector search is to be made from an aircraft carrier. The position of the carrier may, for example, be at 0800, latitude 41° 4' north, longitude 52° 4' west, course 160°, 25 knots. The pilot's orders are to depart from carrier at 0800, search a relative sector from 60° to 90° for 120 miles, returning to carrier; flight level 2,000 feet, true air speed 110 knots, temperature 45° C., wind from 034°, force 20 knots. The pilot must determine, from the data given, the true heading to be maintained, speed of relative movement, true course, distance covered, and ground speed for each of the three legs of the search, and the time for making each turn required to fly the course.

Since the back leg of the search will always be flown first, the pilot will solve for the back leg first. This may be done by first setting the arm 12 to the wind direction 034° and setting point E to the wind velocity. Arm 15 will then be adjusted for the course of the carrier, 160°, and the point S will be set at the speed of the carrier.

The length of arm 11 will then be set at true air speed, 110 knots, and the angular position of arm 16 will be set for the direction of relative movement, 60°. With this setting the length of arm 13 will then be the ground speed, 94 knots, Cus. 75°, and the angular position of arm 11 the true heading, 68.5°.

When the course and speed of the carrier, the wind direction and velocity, the true air speed, and the direction of relative movement, which are known, are set, the ground speed, 94 knots, may be determined by reading the scale on arm 13; the true course, 75, by reading the angular position of arm 13 on scale 10a through the use of disk 14; the true heading 68.5°, from the angular position of arm 11; and the speed of relative movement between airplane and carrier, 95.5 knots, may be read from arm 16. The time for making the turn to the second leg of the course is determined by dividing 120 miles by the speed of relative movement, and is 75.5 minutes.

The distance covered on this leg is ground speed multiplied by time, and is 118 miles.

To solve for the second leg, it is first necessary to find the true course and distance of this leg and true heading. This is found, in the case given, to be 164° and the distance 77 miles. In setting the computer, since wind direction and velocity, true air speed, and surface ship's course and speed are unchanged, it is only necessary to swing point P until arm 16 has the angular position of the direction of relative movement of the second leg. The new direction, 165°, and speed of relative movement, 97 knots, ground speed, 122 knots, and true heading, 156°, may now be read as before, and the time, 38 minutes, for making the second turn obtained.

The third leg may be solved for in the same way, by swinging point P until arm 16 reaches 270°, the given direction of relative movement for the third and last leg. From arm 13, true course is found to be 259°, and ground speed 123 knots; from arm 11 true heading is 266, and from arm 16 speed of relative movement is 130 knots. Knowing the distance to the point of interception with the carrier to be 120 miles of relative movement, the time of the last leg is found to be 55.5 minutes and the time of interception 10:49.

It will be apparent that the method which I employ makes a vectorial solution, but the vectors are not lines, but the arms 11, 13, 16, 12, and 15, and since these are all connected at the proper points and arranged in proper relation to each other, there is no possibility of error due to incorrect laying out of the vectors, as in a solution worked out on paper, or in the length of each arm or vector since it is read direct.

While I have shown and described certain preferred embodiments of my invention, it will be understood that modifications and changes may be made without departing from the spirit and scope thereof, as will be clear to those skilled in the art.

I have particularly pointed out and distinctly claimed the part, improvement, or combination which I claim as my invention or discovery, and in the specification I have explained the principles thereof and the best mode in which I have contemplated applying those principles so as to distinguish my invention from other inventions.

I claim:

1. A navigation computer comprising, in combination, a compass rose, an extensile arm pivotally secured for rotation to the center of said compass rose, said arm being provided with a scale indicating speed, a second arm pivotally secured to the center of said compass rose for rotation, said second arm carrying a scale indicating wind velocity, and a second extensile arm pivoted at one end to the outer end of the first extensile arm and at the other end to an adjustable point on said second arm, said third arm carrying a scale indicating speed.

2. A navigation computer comprising, in combination, a compass rose, an extensile arm pivotally secured for rotation to the center of said compass rose, said arm being provided with a scale indicating speed, a second arm pivotally secured to the center of said compass rose for rotation and having means for fixing its adjusted angular position, said second arm having a scale indicating wind velocity, and a second extensile arm having one end pivoted to the outer end of the first extensile arm and the other end slidably and pivotally mounted upon said second arm, said second extensile arm carrying a scale indicating speed.

3. A navigation computer comprising, in combination, a compass rose, a telescoping arm pivotally secured for rotation to the center of said compass rose, said arm being provided with a scale indicating speed, a second arm pivotally secured to the center of said compass rose for rotation, said second arm having a scale indicating wind velocity, and a second telescoping arm having one end pivoted to the outer end of the first telescoping arm and the other end adjustably and pivotally mounted upon said second arm said second telescoping, carrying a scale indicating speed.

4. A navigation computer comprising, in combination, a compass rose, a first arm comprising two parts slidable on each other and pivotally secured for rotation to the center of said compass rose, said arm being provided with a scale indicating speed, a second arm pivotally secured to the center of said compass rose for rotation, said second arm carrying a scale indicating wind velocity, and a third arm comprising two parts slidable on each other pivoted at one end to the outer end of the first arm and at the other end to an adjustable point on said second arm, said third arm carrying a scale indicating speed.

5. A navigation computer comprising, in combination, a compass rose, a first arm and a second arm pivotally secured for rotation to the center of said compass rose, a third arm pivotally connected between the outer end of the first arm and an adjustable point on the second arm, a fourth arm having one end pivotally secured to the connection between the second and third arms, and a fifth arm having one end pivotally connected to the connection between the first and third arms, and its other end pivotally connected to an adjustable point on said fourth arm; said first, third, and fifth arms being extensile, and all of said arms carrying speed-indicating scales.

6. The combination claimed in claim 5, with means for locking the adjustment of one or more of the following: the length of the first arm, the angular position of the second arm, the point of connection of the third and fourth arm to the second arm, the angular position of the fourth arm, and the point of connection of the fifth arm to the fourth arm.

7. A navigation computer comprising, in combination, a compass rose, first and second arms pivotally secured to the center of said compass rose for rotation, third, fourth, and fifth arms pivotally secured together to form a triangle having one vertex pivotally secured to the outer end of the first arm, and a second vertex secured to an adjustable point on said second arm, the length of all three sides of said triangle being adjustable, and the length of the first arm and of two arms of said triangle being adjustable intermediate their pivot points.

8. A navigation computer comprising, in combination, a compass rose, first and second arms pivotally secured to the center of said compass rose for rotation; third, fourth, and fifth arms pivotally secured together to form a triangle having one vertex pivotally secured to the outer end of the first arm, and a second vertex secured to an adjustable point on said second arm, the length of all three sides of said triangle being adjustable, and the first arm and two arms of said triangle being extensile.

9. A navigation computer comprising, in combination, a compass rose, first and second arms pivotally secured to the center of said compass rose for rotation, third, fourth, and fifth arms pivotally secured together to form a triangle having one vertex pivotally secured to the outer end of the first arm, and a second vertex secured to an adjustable point on said second arm to form a pair of triangles having one side common, the length of all three sides of both said triangles being adjustable, and two arms of each triangle being extensile.

10. A navigation computer comprising, in combination, a compass rose, an extensile arm pivotally secured for rotation to the center of said compass rose, said arm being provided with a scale indicating speed, a second arm pivotally secured to the center of said compass rose for rotation, said second arm carrying a scale indicating wind velocity, a second extensile arm pivoted at one end to the outer end of the first extensile arm and at the other end to an adjustable point on said second arm, said third arm carrying a scale indicating speed, and a disk pivotally secured to the center of said compass rose for rotation, said disk being provided with a pointer, and a plurality of lines thereon parallel to said pointer.

11. The combination claimed in claim 10, in which said disk is of transparent material.

12. The combination claimed in claim 10, in which said compass rose is of transparent material having a center frosted area.

13. The combination claimed in claim 10, in which said disk is of transparent material and carries a wind velocity scale.

14. A navigation computer comprising, in combination, a compass rose, an extensile arm pivotally secured for rotation to the center of said compass rose, said arm being provided with a scale indicating speed, a second arm pivotally secured to the center of said compass rose for rotation, said second arm carrying a scale indicating wind velocity, and a second extensile arm pivoted at one end to the outer end of the first extensile arm and at the other end to an adjustable point on said second arm, said third arm carrying a scale indicating speed, the connection at the disk end of one of said extensile arms being quick detachable.

15. A navigation computer comprising, in combination, a compass rose, a first arm and a second arm pivotally secured for rotation to the center of said compass rose, a third arm pivotally connected between the outer end of the first arm and an adjustable point on the second arm, a fourth arm having one end pivotally secured to the connection between the second and third arms, and a fifth arm having one end pivotally connected to the connection between the first and third arms, and its other end pivotally connected to an adjustable point on said fourth arm; said first, third, and fifth arms being extensile, and all of said arms carrying speed-indicating scales, and the second arm having means at its outer end to which the fourth arm may be secured.

16. A navigation computer comprising, in combination, a compass rose, an extensile arm pivotally secured for rotation to the center of said compass rose, said arm being provided with a scale indicating speed, a second arm pivotally secured to the center of said compass rose for rotation, said second arm carrying a scale indicating wind velocity, and a second extensile arm pivoted at one end to the outer end of the first extensile arm and at the other end to an adjustable point on said second arm, said third arm carrying a scale indicating speed, at least one of said extensile arms having its pivots offset in line with one edge thereof.

ASHER M. WOLFE.